April 27, 1926.
A. E. LINDSTROM
1,582,337
COMBINATION FORK AND TRAY
Filed April 8, 1925
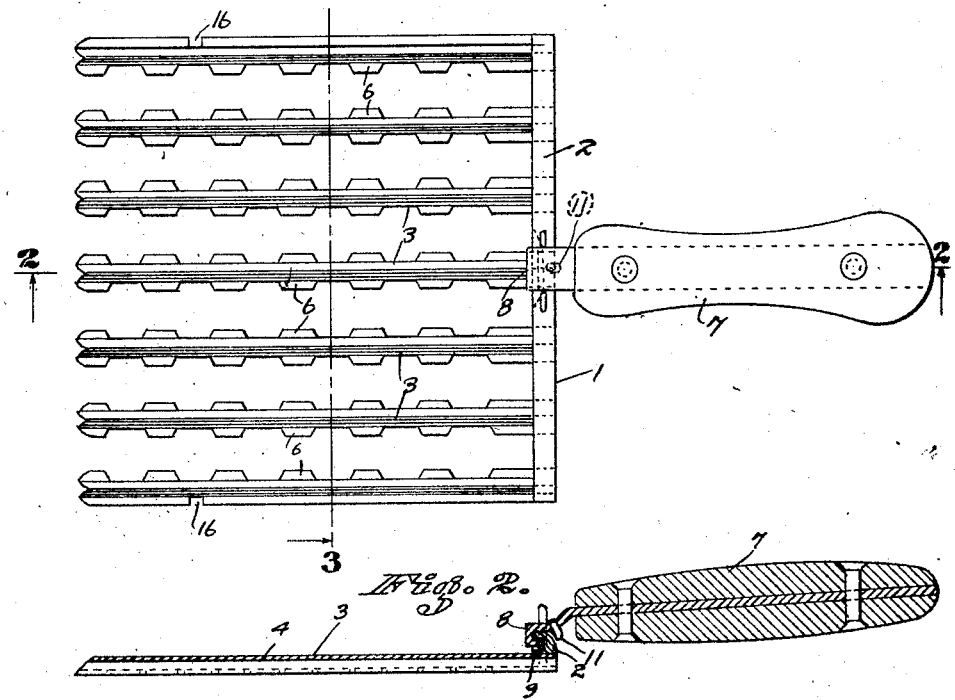
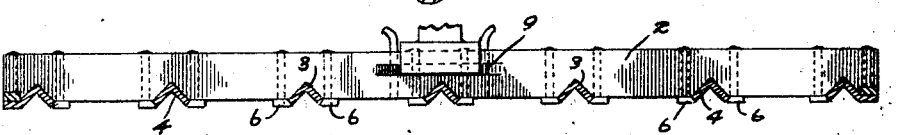
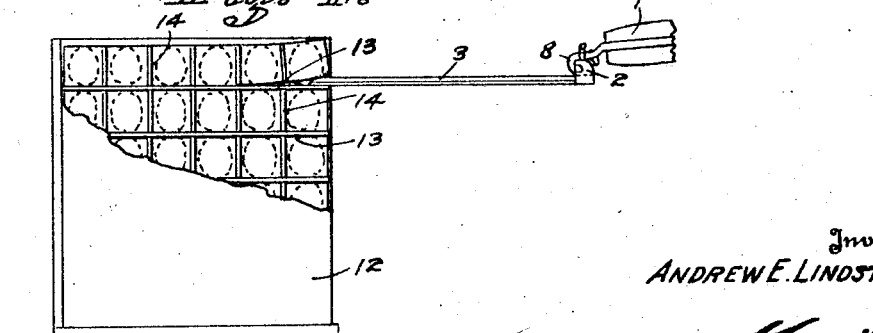
Inventor
ANDREW E. LINDSTROM
By
Attorneys Patented Apr. 27, 1926.

1,582,337

UNITED STATES PATENT OFFICE.

ANDREW E. LINDSTROM, OF SAN FRANCISCO, CALIFORNIA, ASSIGNOR TO KASSER EGG PROCESS COMPANY, OF SAN FRANCISCO, CALIFORNIA, A CORPORATION OF CALIFORNIA.

COMBINATION FORK AND TRAY.

Application filed April 8, 1925. Serial No. 21,644.

*To all whom it may concern:*

Be it known that I, ANDREW E. LINDSTROM, a citizen of the United States, and a resident of San Francisco, in the county of San Francisco and State of California, have invented a new and useful Improvement in Combination Forks and Trays, of which the following is a specification.

The present invention relates to improved means for handling eggs and has particular reference to a tool which may be described as a combination fork and tray and which allows a complete pre-arranged layer of eggs, such as usually found in egg cases, to be lifted as a unit and to be transferred to a machine for processing the eggs. The latter machine will be described in a separate application, it being desired to confine the present application to the tool for manipulating the eggs.

The preferred form of my combination fork and tray for handling eggs is illustrated in the accompanying drawing, in which—

Figure 1 shows a top plan view of the same.

Figure 2 a longitudinal section taken along line 2—2 of Figure 1.

Figure 3 a transverse section taken along line 3—3 of Figure 1, and

Figure 4 a view illustrating the use of my tool, the same being shown at the initial stage of engagement with the upper layer of eggs in an egg case.

While I have shown only the preferred form of the invention, it should be understood that various changes or modifications may be made within the scope of the claims hereto attached without departing from the spirit of the invention.

My tool 1 comprises a transverse bar 2 to the bottom of which are secured a plurality of prongs 3 arranged parallel to one another and in a single plane. The prongs are preferably ridged as shown at 4 so as to represent the form of an inverted V and the distance between each two prongs is such that a normal sized egg may rest on the two confronting slanting faces of two adjacent prongs without falling through the space between the prongs and without extending beyond the central vertical planes of the prongs, so that a second series of eggs may be supported in the adjacent space. Each prong is provided with lateral projections 6 extending a short distance into the space between each two prongs and arranged to cooperate with the ridged prongs in furnishing individual seats for a series of eggs, the projections being alined transversely so as to provide a plurality of transversely as well as longitudinally alined individual seats for a corresponding plurality of eggs.

A handle 7 of any suitable form is secured to the transverse bar 2 for easy removal and insertion by means of the bent end portion 8 of the handle which is made to extend over the top and the front face of the bar into a recess 9 in the latter front face with a stop 11 bearing on the rear face of the bar for the purpose of preventing disengagement of the handle from the bar when the handle is held in a horizontal position, but allowing the handle to be removed when the same is tilted forwardly.

The manner of using my tool is illustrated in Figure 4. A case 12 with eggs is shown in side view with a portion of the side broken away to show the interior. Eggs are arranged in this case in the customary manner, that is, in successive layers with pieces of cardboard 13 separating the layers and frames 14 of cardboard separating the eggs of each layer and arranging the same in parallel rows. The front of the case is opened and in using my tool the front end of the same is placed along the edge of the uppermost floor 13 as shown in Figure 4 and pushed inwardly, whereby the cardboard frame is slightly lifted from the floor while the eggs enter the spaces between the prongs of my tool. After the tool has been introduced to the full length thereof, each egg occupies substantially a space defined by two prongs of the fork and the two projections 6, and if the tool is now lifted by means of the handle 7, each egg will naturally become seated so that the general arrangement of the eggs on my tool will exactly correspond to their arrangement within the case. The tool with the eggs thereon is now transferred to a processing apparatus, the cardboard frame removed and the eggs are treated without disturbing their arrangement. After treatment, they may be removed, while still maintaining the arrangement so that the cardboard frame may be returned to its place and thereafter the eggs returned to the case without their arrangement having been changed in any way. For the purpose of processing the eggs, it it convenient to have the handle removable since the same would unnecessarily interfere with the convenient handling of the trays in the machine. The handle can be very easily removed by merely tilting the extreme end thereof upwardly which will automatically release the handle from the tray.

In the processing machine to be described in a separate application the trays are arranged on a circular track and interconnected by removable spiders. To allow of easy engagement of the spiders with the trays, the latter are provided with notches 16 in the outer faces of the end prongs.

I claim:

1. A combination fork and tray for handling eggs or the like comprising a transverse bar having parallel prongs extending therefrom, the prongs being formed with lateral projections made to allow the fork to be slipped under a plurality of pre-arranged eggs and to form individual seats for the eggs when the device is lifted.

2. A combination fork and tray for handling eggs or the like comprising a transverse bar having parallel prongs extending therefrom, the prongs being ridged and formed with short lateral projections extending from the base of each ridge and made to allow the prongs to be slipped between adjacent pre-arranged rows of eggs and to form individual seats for the eggs when the device is lifted.

3. A combination fork and tray for handling eggs or the like comprising a transverse bar having parallel prongs extending therefrom, the prongs being formed to provide a series of individual seats for eggs between each two prongs, and a handle removably secured to the transverse bar.

ANDREW E. LINDSTROM.